United States Patent [19]

Zumchak et al.

[11] Patent Number: 4,622,652
[45] Date of Patent: Nov. 11, 1986

[54] SIGNAL IDENTIFICATION

[75] Inventors: Eugene M. Zumchak, Erie County, N.Y.; William O. Swan, King County, Wash.

[73] Assignee: Applied Microsystems Corporation, Redmond, Wash.

[21] Appl. No.: 610,351

[22] Filed: May 14, 1984

[51] Int. Cl.⁴ ............................................. G06F 11/22
[52] U.S. Cl. ..................................... 364/900; 371/20; 371/25
[58] Field of Search ... 364/200 MS File, 900 MS File; 371/20, 25; 324/73 R, 73 AT

[56] References Cited

U.S. PATENT DOCUMENTS 4,510,572  4/1985  Reece et al. ..................... 371/25 X

*Primary Examiner*—Raulfe B. Zache
*Attorney, Agent, or Firm*—Seed and Berry

[57] ABSTRACT

A device and process for identifying signals in microprocessors-based circuits includes a probe, a display a target interface and a control system based on a similar microprocessor. Sets of signal patterns are impressed on lines in the target system. The patterns are selected so as to create unique signatures for all data lines, address lines, control lines, combinations of control lines and their complements. To associate the node with a data line, a signal pattern is written to a single address in the target system. After the pattern is impressed the signature of the response is compared with a table of responses that would be expected. If it is not identified, then the target system is subjected to a series of read functions. The address from which the data is read is determined by a second stimulus pattern. After the read operations, the signature of the response at the node is compared with expected signatures. If no match is found, then an attempt is made to associate the node with system control lines or combinations of those lines by impressing a third pattern on the system control lines. The stimulation sequence is repeated several times. The signature at the node is compared with expected signatures. If the signature match is not found in any of the above steps the identity of the associated line or combination of lines is indicated. If it is not, then the signature itself is displayed.

16 Claims, 14 Drawing Figures

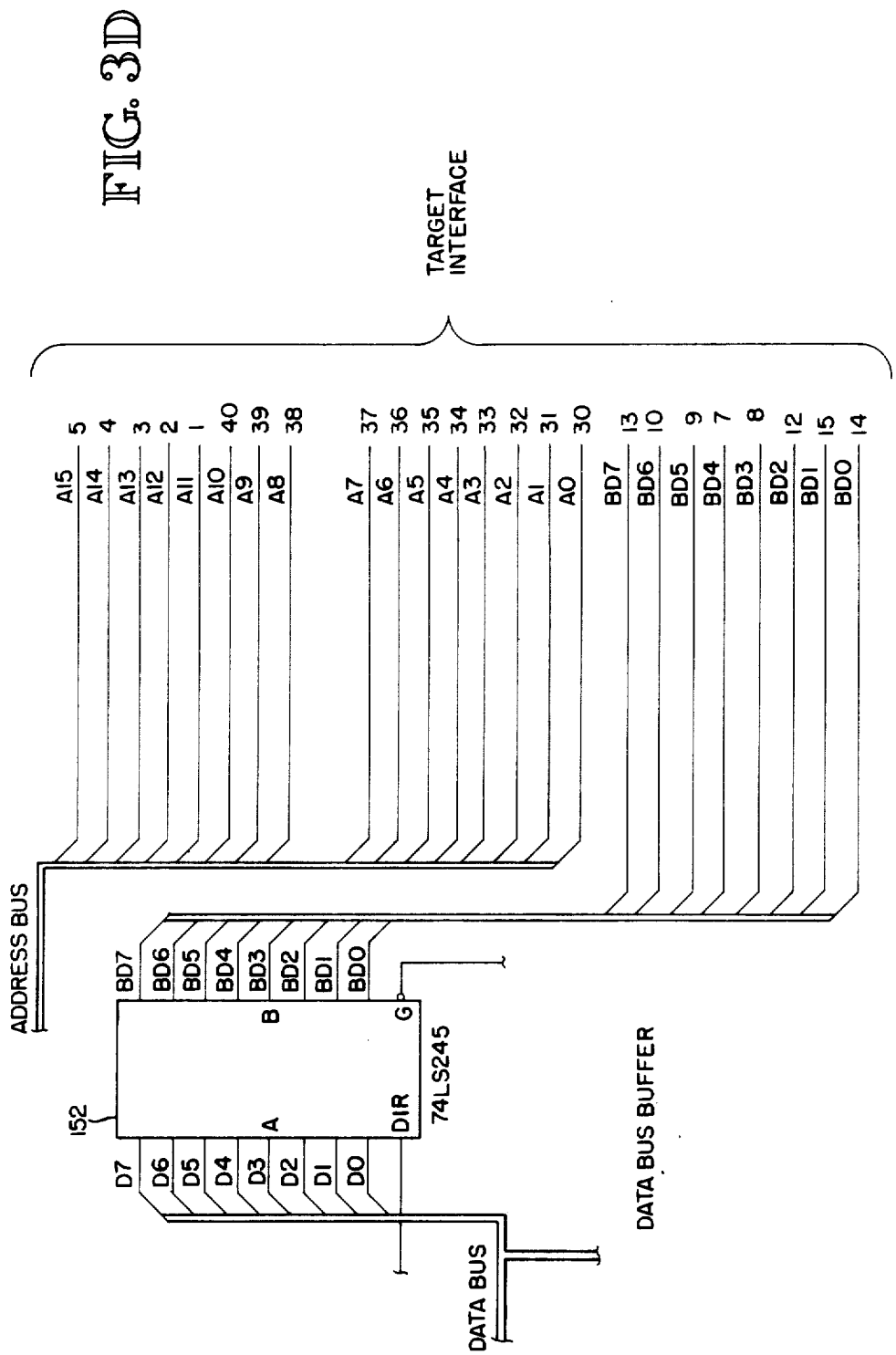

| | | | |
|---|---|---|---|
| 0010 | 3E | LD | A, 10H |
| 0012 | 32 FF FF | LD | (FUZE),A |
| 0015 | 3A 10 00 | LD | A,(EXTERNAL ADDRESS) |

SIGNAL IDENTIFICATION

DESCRIPTION

1. Technical Field

The invention relates to the identification of data, address, control lines and related lines in microprocessor-based circuits.

2. Background Art

Microprocessor system troubleshooting is decidedly different than other types of electronic troubleshooting. Unfortunately, until recently, the tools that have been available for this purpose have not adequately met the needs of the troubleshooters. Even the new, recently available tools have some shortcomings.

Any computer system, including microprocessor based systems, includes three elements: a central processing unit, CPU or MPU; memory, ROM and RAM; and input/output.

A typical microprocessor has eight data lines, sixteen address lines and a few control lines. A fault in any one of them as well as connecting circuitry can prevent the processor from successfully running a program. Many microprocessor systems are provided with their own diagnostic programs, but a fault within the microprocessor system can prevent the microprocessor from running and from permitting the diagnostic program to perform its intended function.

Since the signals in the microprocessor circuits are changing at MHz rates, the problem of microprocessor system troubleshooting includes the need to observe in excess of 25 fast-moving signals simultaneously. Because of the sophistication of the microprocessor and the types of signals that are passing through it, the troubleshooting technique must be correspondingly sophisticated.

The types of faults which may appear, and do appear, in circuitry incorporating microprocessors include, among others, open traces, shorted traces, open-plated through-holes, missing wires, misplaced wires, failed components and missing components.

Automatic test equipment, ATE, is often used for production testing and in-plant service of these types of systems.

The need has arisen for a form of testing equipment that is not as complex to program as ATE's in order to conduct the tests desired, portable, less expensive, and yet has a high degree of flexibility to permit the testing of different systems.

To meet another need for testing at the design and production level without the expense and complexity of an ATE, microprocessor diagnostic emulators have been developed. Emulators of the type referred to have been developed and manufactured by Applied Microsystems Corporation of Redmond, Wash. The operation of such Emulators are described in Applied Microsystem's User Manual No. 920-10647-00 for the EM180/180B Diagnostic Emulator for the Zilog, Incorporated Z80 microprocessor amongs others. Emulators have been available from others, also.

Several tests have been implemented in the emulators to aid in the detection and location of faults in the microprocessor circuitry.

The invention relates to the providing of further capabilities beyond some of the tests which have been previously implemented in ATE's.

Among the tests which have been implemented previously to test microprocessor systems is the shorts test. In this test we would look to see whether any pin of the microprocessor is shorted to another pin. This test is done with the target system power off and the system components do not need to be installed. All pins of the microprocessor are set low and then the pins are set high one at a time, or vice versa, to see if any other pins are affected.

Another test which has been implemented previously in ATE's is the stuck bits test. In this test the power is turned on in the target system. The output pins of the microprocessor are then checked one at a time. They are individually set high and the voltage checked to make sure it responds properly and then returned to the low state and the voltage is checked to make sure that it in fact returns to the low state.

In addition to the previous tests, memory tests have also been conducted.

RAM is checked with a read-write test. In this test sequence, the RAM is checked to see if each bit can be set high and low independently of each other bit in memory. Sometimes this test includes only selected segments of the memory in order to shorten the testing process.

A ROM test is also normally conducted. This may take the form, most commonly, of either a cyclical redundancy check, CRC test, and/or a checksum.

If a fault is detected on the board, it could arise either because we have a problem with the component or because there is a problem with the circuit board or wiring. This is the point where signature analysis techniques can be helpful. Signature analysis techniques have been developed to meet the needs for testing short of the ATE approach. This technique is described in U.S. Pat. No. 3,976,864, Gordon et al. Emulators have been provided with signature analysis capabilities in order to enhance the capabilities of the equipment to meet the needs short of requiring the use of complicated ATE systems. Another implementation of signature analysis in testing is disclosed in European Patent Application No. 82111450.1, filed Oct. 12, 1982, published Nov. 8, 1983, publication No. 0085772, entitled "Signature Analysis System For Testing Digital Circuits" by Data I/O Corporation of Redmond, Wash., U.S.A.

Using signature analysis, the nodes within the system can be probed and then the signature of the node compared with the signature for a known good system, or for those signatures listed for common faults. Signature analysis can indicate those nodes where the proper signatures are not correct but little information beyond the fact that they are incorrect is known.

The utilization of signature analysis presumes that the manufacturer or someone having an interest in the maintenance of the microprocessor system has taken the time and effort to develop the signature analysis documentation. Among the other shortcomings of signature analysis is the requirement for special fixtures or functional modification to the target system required to perform the signature analysis. Minor modifications to the target system changes the signatures at many nodes within the target system. This requires a change in documentation.

For this reason, the inventors implemented a system of signal identification to provide further information.

Signal identification is utilized to identify signals in the target system which are generated by the microprocessor, related signals, and to provide a method of indicating those which do not properly correspond.

DISCLOSURE OF INVENTION

A device and process for identifying signals in microprocessors-based circuits is provided. The device includes a probe which contacts the node in the target system which is to be identified. It further includes a display on which the identity of the node probed is indicated as determined by the apparatus control system. The control system interfaces with the target system by use of a connector which is received in the target system's microprocessor socket. Through the use of the device and the process the user will be advised whether the node probed represents a node connected to a data line, address line, control line or certain combinations of such lines or a line carrying a complement of signals carried on any such lines. If the node cannot be so identified a signature for that node will be provided for possible association with other nodes which may carry the same signature.

Sets of signal patterns are impressed on lines in the target system. The patterns are selected so as to create unique signatures for all data lines, address lines, control lines, combinations of control lines and their complements in the target system.

An attempt is first made to identify the node as being associated with the data line. A signal pattern is written to a single address in the target system. After each element of the target pattern is impressed on the target system, the response at the node probed is entered into a signature generator. After the entry of the final pattern element in the series the signature from the signature generator is compared with a table of responses that would appear on data lines and their inversions in a properly operating target system. If their signature matchs then the node is identified. If it is not identified, then an attempt is made to associate the node with the address lines.

The target system is then subjected to a series of read or analogous functions. The address from which the data is read in the target system is determined by a second multi-element stimulus pattern. After each read operation, the response of the node being probed is entered into a signature generator. After all the read operations have been performed, the signature from the node probed is compared with signatures which would be obtained for properly operating address lines in a target system. If the signature is identified, then the identity of the address line is displayed. If no match is found, then an attempt is made to associate the node with the target system control lines or combinations of those lines.

The control system is then set up to impress the first element of a third stimulus pattern on the target system control lines. The response at the node probed is then entered into the signature generator. This process is repeated for each element of the series. The entire stimulation process is repeated several times using the third stimulation pattern. After the process has been repeated the signature of the node probed is compared with signatures that would be present if the target system were operating properly. If the signature match is found, the identity of the associated line or combination of lines is indicated. If it is not, then the signature itself is displayed.

BRIEF DESCRIPTION OF THE DRAWINGS

FIGS. 3A, 3B, 3C, 3D and 3E are a schematic diagram of the remainder of the control system and the target interface from FIG. 1.

BEST MODE FOR CARRYING OUT THE INVENTION

Figure 1:
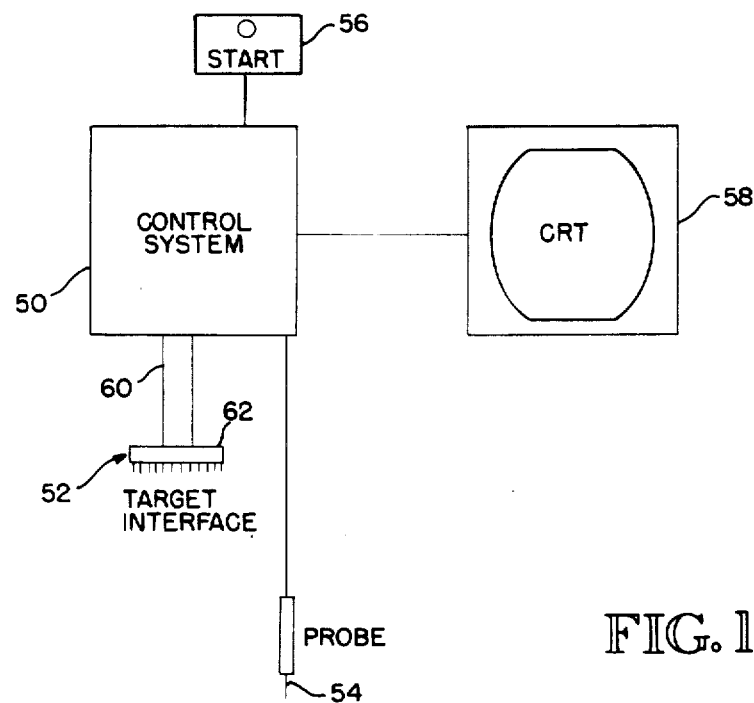
FIG. 1 is a block diagram of the components of the preferred embodiment of a signal identification apparatus.

The invention relates to a device and process for signal identification in microprocessor-based circuits. The invention permits the user to probe nodes within the target system and provide information about those nodes, useful in troubleshooting. More specifically, the invention will advise the user whether the node represents a node connected to a data line, address line, control line, or certain combinations of such lines or a line carrying inversion of signals on any such lines. Further, the invention will provide an indication if a node is not one of such signals and provide the signature for the signal at that node. That signature may be useful in identifying the node and related nodes in the target circuit which may have the same signature. The invention may be utilized in troubleshooting any microprocessor circuit independent of the function of that microprocessor controlled circuit.

In order to identify a node probed in a target system sequences of signals are impressed on certain lines in the target system. The signal pattern and the manner and location in which it is introduced to the target system are selected so as to generate in the target system unique signatures for data lines, address lines, control lines, certain combinations of control lines, and their complements in the target system.

In the description of the preferred embodiment described below, the method and apparatus for carrying out the identification process is described. The device described is designed for use in connection with the Z80 manufactured by Zilog, Incorporated of Campbell, Calif. U.S.A. The implementation for other microprocessors would be analogous to the implementation described below.

Nodes in the target system are contacted with a probe prior to the introduction of the signals to the target system. After the target system has been stimulated with a signal pattern the signature taken at the node is compared with known signatures in an attempt to identify the node and associate it with the identified node.

In the sequence of operation described below, an attempt is first made to identify the node as being associated with a data line. If it cannot be so identified, then signals are introduced in order to attempt to identify and associate the node with address lines. If this cannot be done, then a signal pattern is introduced to the target system in order to attempt to associate the node with control lines or certain combinations of control lines. If the node cannot be associated with any of the foregoing forms of lines, then the signature for the node is displayed.

In order to identify data lines, the data lines of the target system are stimulated. The first element of a signal pattern is written to a single address in the target system. More specifically, the first pattern of the series to be used is selected, the signal identification equipment set up in order to transmit the pattern to the target system, then the pattern is impressed on the target system and the response at the node being probed is entered into the signature genertor. The process is then repeated for the remaining patterns in the series. Once the series has been completed then the resulting signature from the probed node is compared with a table of signatures and their complements which would occur on data lines in a properly operating target system. If the signature is located, then the identity of the associated data line is indicated. If the signal is a complement in such a data line then that is also indicated. If the signature does not match that signal expected for data lines or their complements an attempt is made to associate the node with address lines. In address line identification the address lines of the target system are stimulated. The target system is subjected to a series of read or analogous functions. The address from which data is read in the target system is determined by the stimulus pattern. More specifically, the signal identification system is set to impress an address specification on the target system. The address specified in the first step of the identification process is the first increment of the data pattern. The target system is accessed and the first pattern element is impressed on the target system. The response at the node being probed is then entered into the signature generator. Another address in the target system is then read with the address corresponding to the second increment in the stimulus pattern. The process is repeated for the entire stimulus pattern. The signature at the node is then compared with signatures that would be expected for the different properly operating address lines in the target system as well as their complements. If such a signature is found then the indentity of the address line is displayed and an indication is provided if it is a complement. If it is not found then an attempt is made to determine if the node is a signal related to the control line signals.

In control line identification a sequence of signals is impressed on the control lines of the target system. More specifically, the control system is set up to impress the first element of the pattern on the target system control lines. The response at the node probed is then entered into the signature generator. Then the pattern impressed on the control lines of the target system is incremented to the second element of the stimulus pattern. The process is then repeated with the second element of the stimulus pattern. Once this process has been repeated for each element in the series forming the pattern the entire stimulation process for the control lines is repeated several time, for example ten times. Then the signature at the node probe is compared with the signatures that would be present on the control lines if they were operating properly or on combinations of those control lines or their inversions. If the signature corresponds then it is identified. If it is not identified then the signature itself is displayed and the process is concluded.

Referring to FIG. 1, the invention includes control systems 50, a target system interface 52, a probe 54, a test start control 56 and a display such as CRT display 58. The control systems include the electronics and software necessary to generate signals in the target system and to identify responsive signals.

The target interface 52, in its preferred form consists of a short ribbon cable 60 or the like connected to an interface device, such as a 40-pin male connector 62. The microprocessor in the target system is removed and connector 62 is connected in its place.

Probe 54 is a probe of the type commonly used in connection with oscilloscopes. In its preferred form, it is a hand-manipulated probe which the operator uses to physically touch the node to be identified in the target system.

The control 56 is a starting device, such as a push button, which activates the control system to identify the node or provide information about the node which the probe is contacting.

The display 58 is provided to indicate either the identity of the data line, address line, or control line or lines to which the node is connected or their inversions. In the absence of the control system's ability to identify the node, the signature of the node would be displayed.

Figure 2:
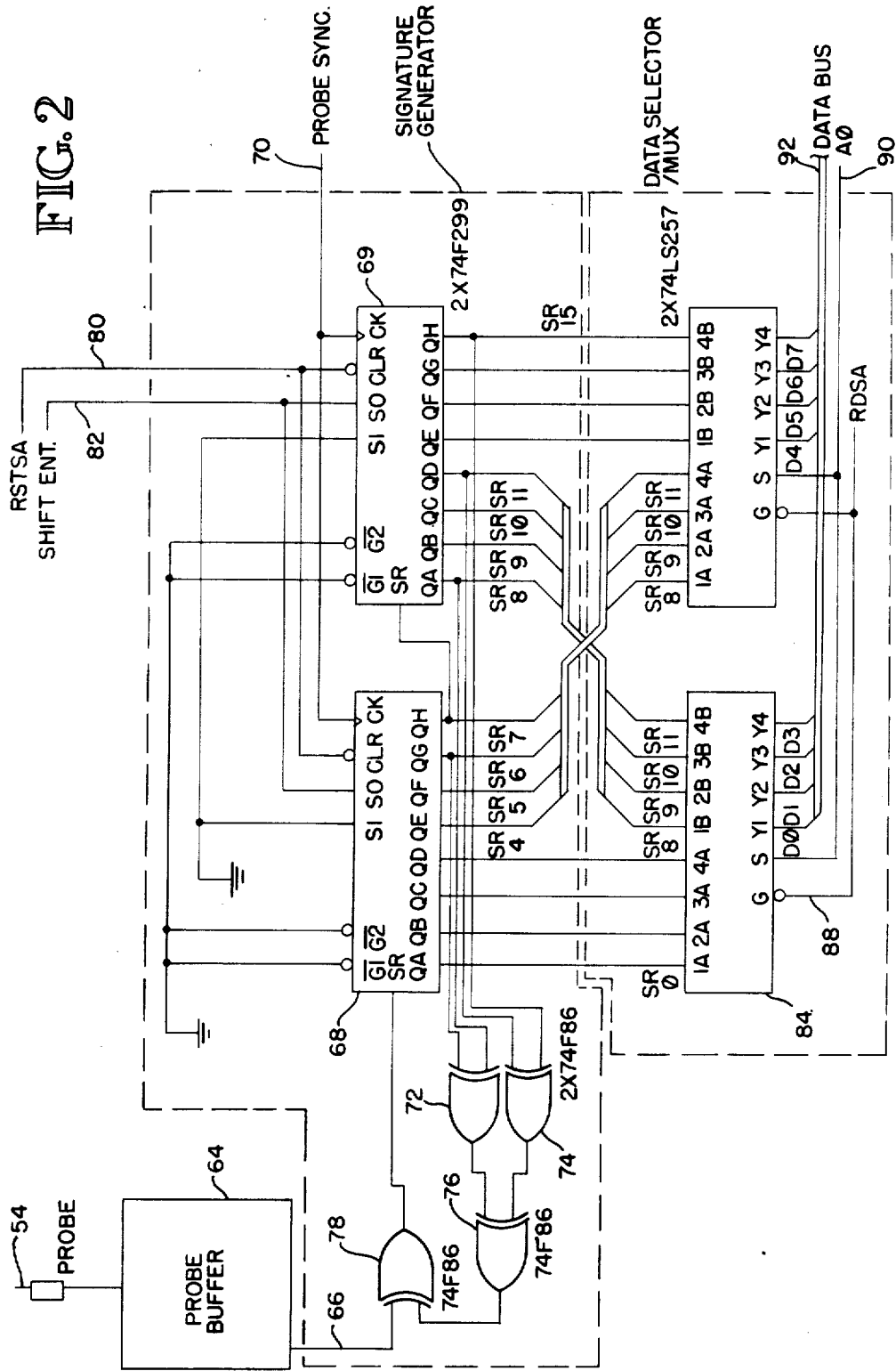
FIG. 2 is a schematic diagram of the probe and a portion of the control system 50 from FIG. 1 illustrating the probe, the probe buffer, the signature generator and the data selector multiplexer.
Figure 3A:
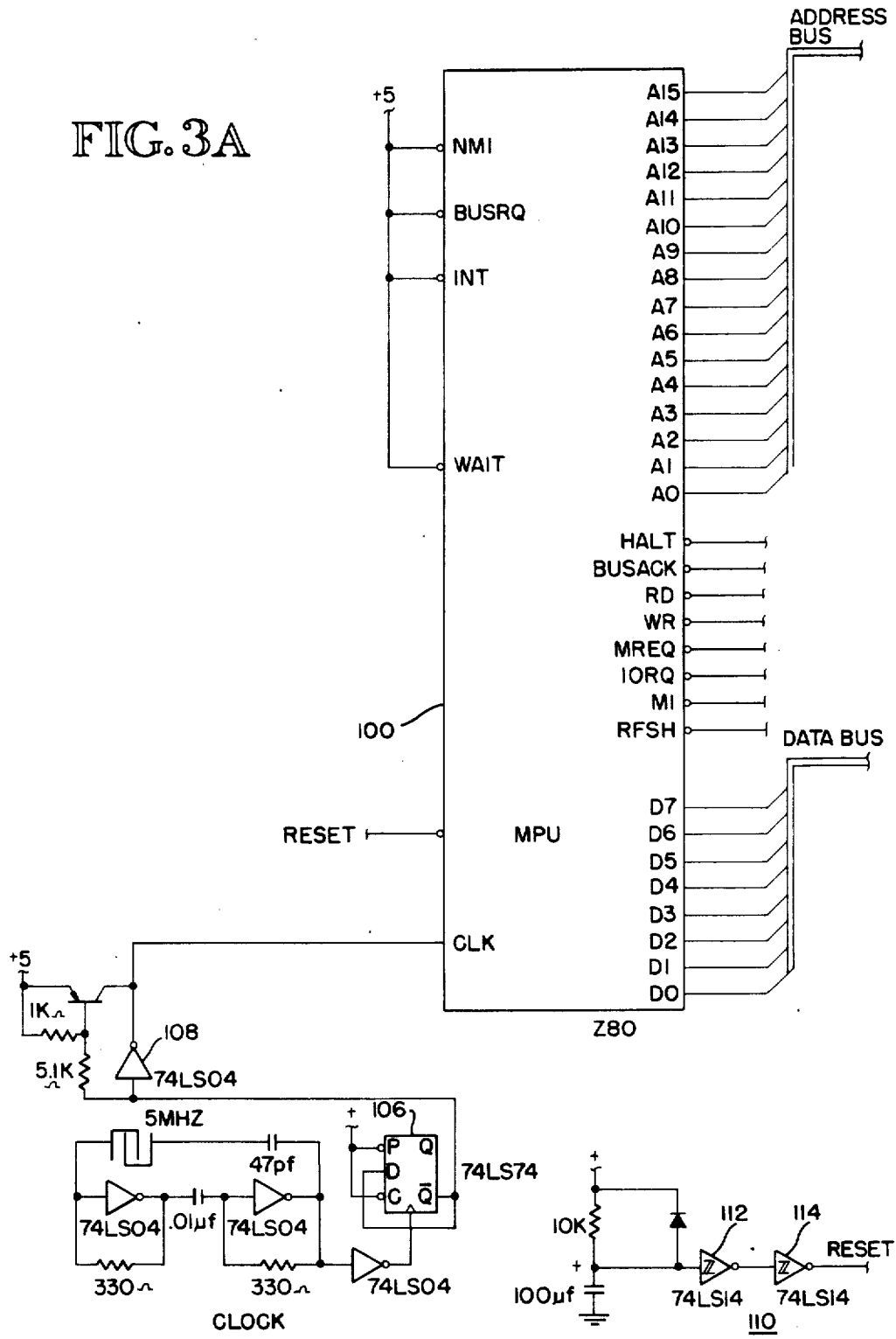
Figure 3B:
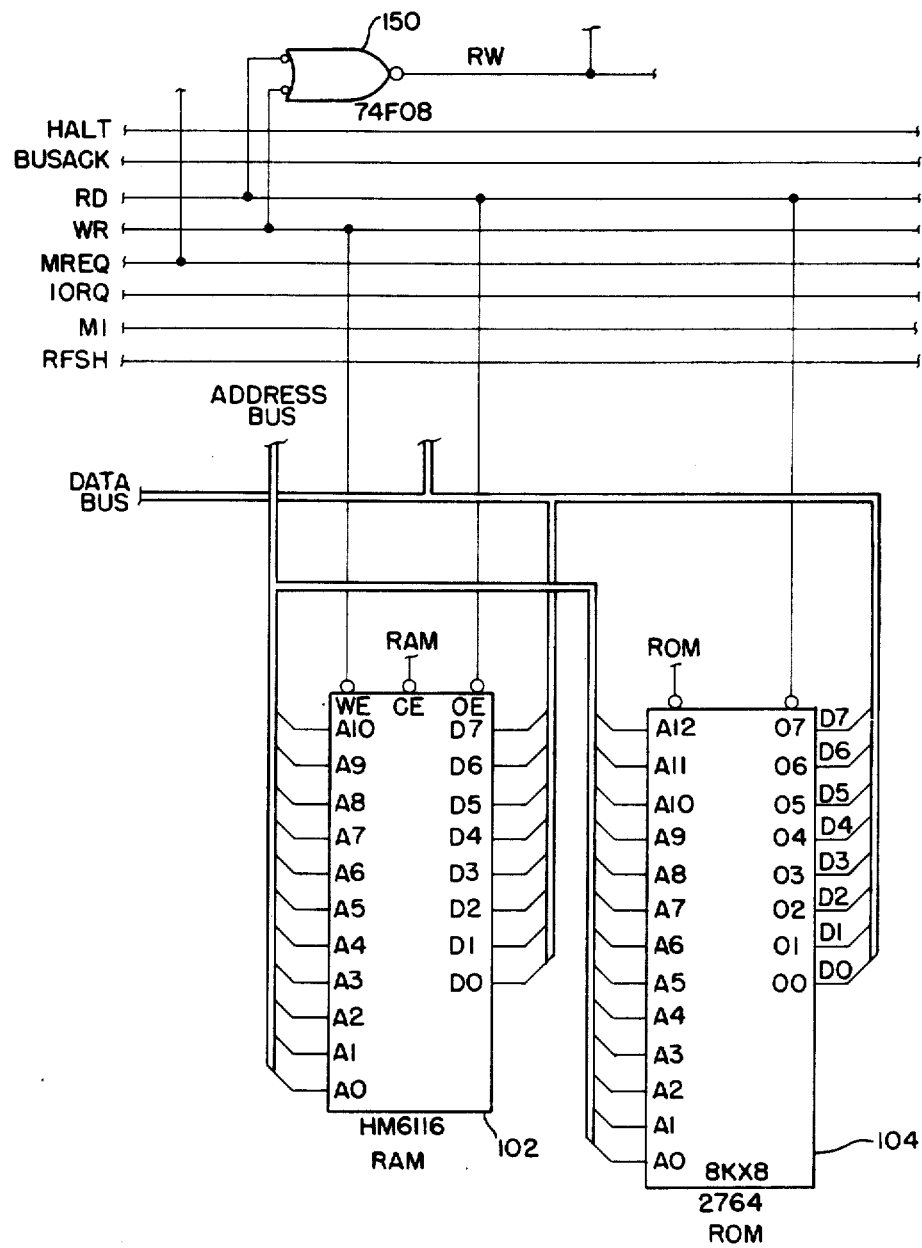
Figure 3C:
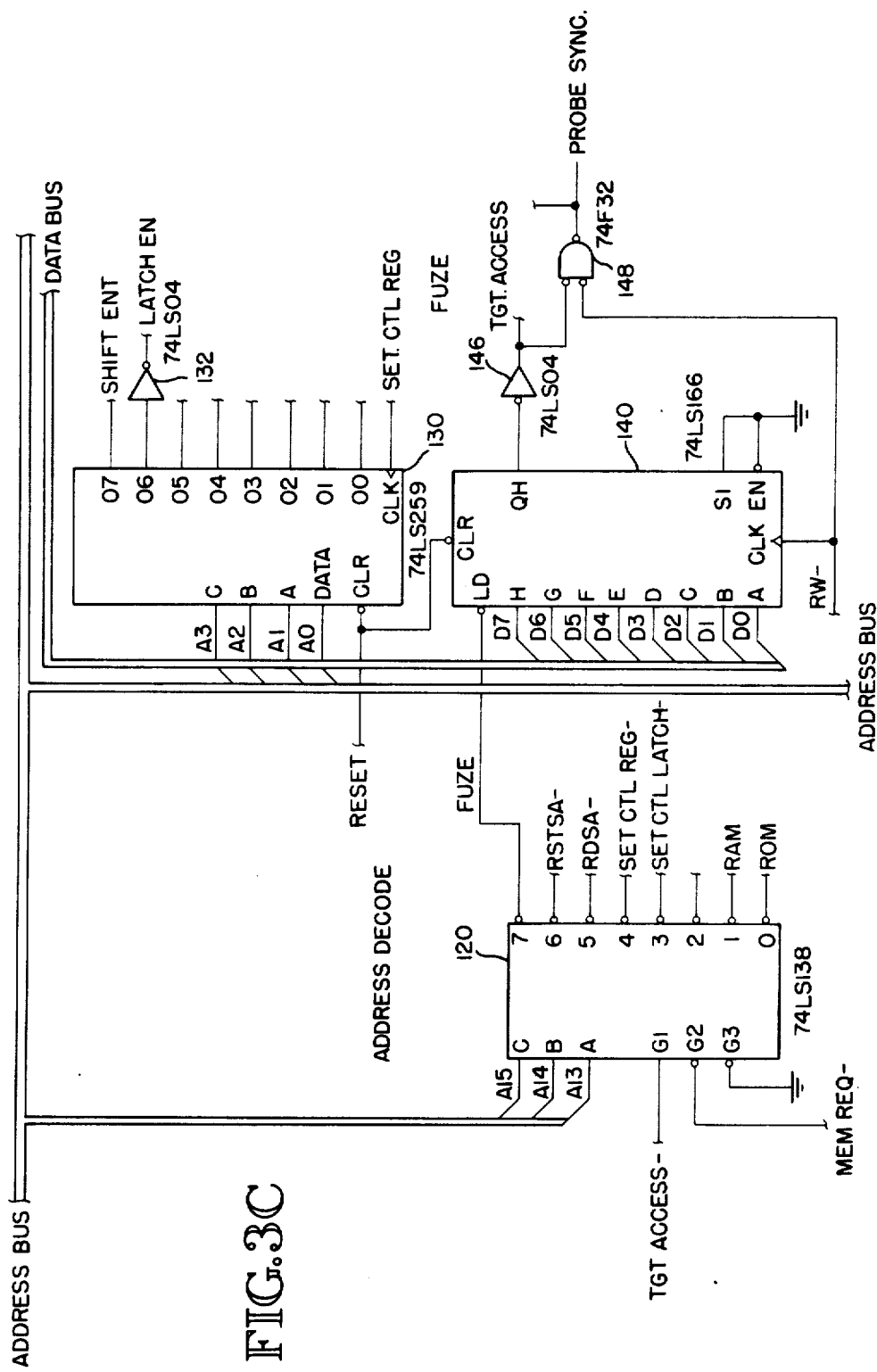
Figure 3E:
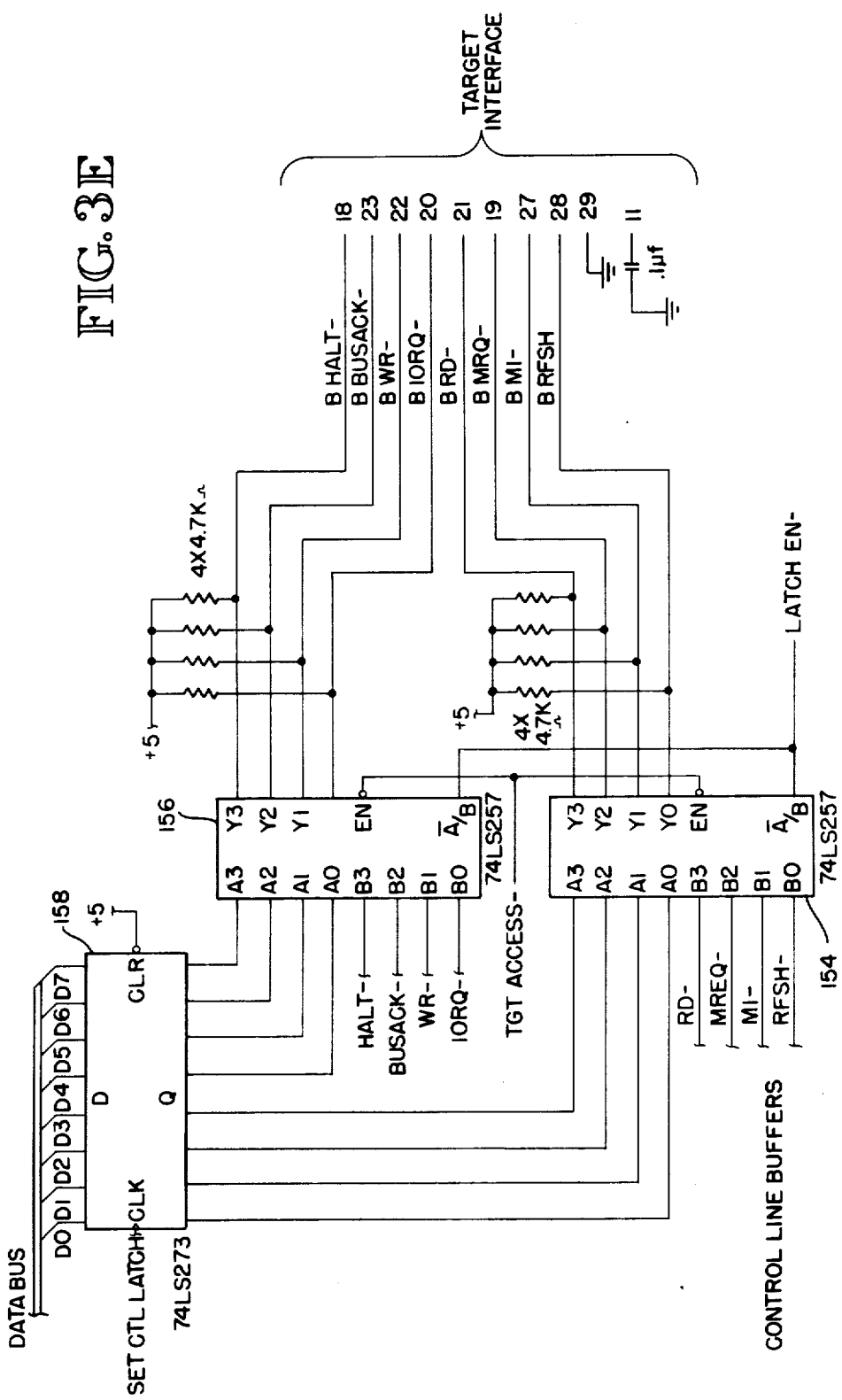

The control system 50 is more fully detailed in FIGS. 2 and 3. A portion of the control system which processes the signal from the probe and converts it to a usable signal using conventional techniques used in signature analysis is illustrated in FIG. 2. The incoming signal from the probe 54 is connected to a buffer circuit 64. This circuitry is conventional and is not illustrated in detail. The buffer provides a high impedance input and the signal is conditioned to logic levels usable in the remainder of the control circuitry. The buffer output on line 66 is then fed to the signature generation portion of the control circuitry. The signature generation is performed like that shown in U.S. Pat. No. 3,976,864, Gordon et al. The signature generation circuitry preferably includes a 16-bit shift register formed by two serially connected 8-bit shift registers 68 and 69. The data is shifted into the registers serially under the control of a signal on connection 70 and identified as PROBE SYNC−. Selected bits of the data probe signal are fed back into the shift register, such as by the use of exclusive OR gates 72, 74, 76 and 78. Other signature generation circuitry or methods may be used. The important thing is to generate a signature representative of a series of signals occurring at the node in question, representative of the state of that node at the different points during the sample period and dependent on the sequence of those states.

The signature analysis function is initialized by a signal on connection 80 and identified as RSTSA−. The generation of the signature is begun by a signal upon connection 82 and identified as SHIFT EN+.

The 16 outputs of the shift register are transferred to the control system data bus 92. Since the data bus is an 8-bit bus, the output of the shift registers 68 and 69 are passed through data selector/multiplexers 84 and 86. The signature is read onto the data bus by a control signal on connection 88 identified as RDSA—. The appearance of a signal on connection 90, identified as A0, determines which bits of the 16-bit signature are read on the data bus. If A0 is low, the least significant bits are read on the data bus. If A0 is high, the most significant bits are read on the data bus 92.

Referring now to FIG. 3, the control system includes a computer, such as microprocessor unit (MPU) 100. This microprocessor unit should be identical or nearly identical with the microprocessor unit associated with the target system. The MPU is connected to memory devices such as the 2K, 8-bit RAM 102 and the 8K, 8-bit ROM 104.

A clock circuit of a conventional configuration is provided. The clock circuit includes a flip-flop 106, which is used to clean up the signal from the crystal oscillator circuit, and an amplifier 108 used to enhance the signal.

A reset circuit 110 is provided to initialize the control system when the power is turned on. It includes two Schmitt triggers 112 and 114. The output of the reset circuit is held low for several milliseconds after the power is turned on in order to initialize the entire system.

An address decoder is provided. It includes a decoder 120. The address decoder provides control enabling strobes for devices in the system as a function of the address designated by the MPU. It is only enabled when the microprocessor asserts a memory request strobe and is active only when the FUZE circuit, described below, is not asserting that the bus access cycle is an external access cycle. Depending on the address line signals received at the address decoder, the address decoder either loads the FUZE circuit, resets the signature generator, reads the signature generator, sets the control line register, sets the control line latch, fetches instructions or data from ROM, or reads or writes from RAM.

A control register is provided in the form of the 8-bit addressable latch 130. One line is used to control the shift register on which the signatures are generated and the other is used to control the data selector used in connection with the control line buffers described below. An output of the addressable latch passes through inverter 132.

A FUZE circuit is provided by shift register 140, which is a parallel-input, serial-output shift register.

Figures 4A, 4D:
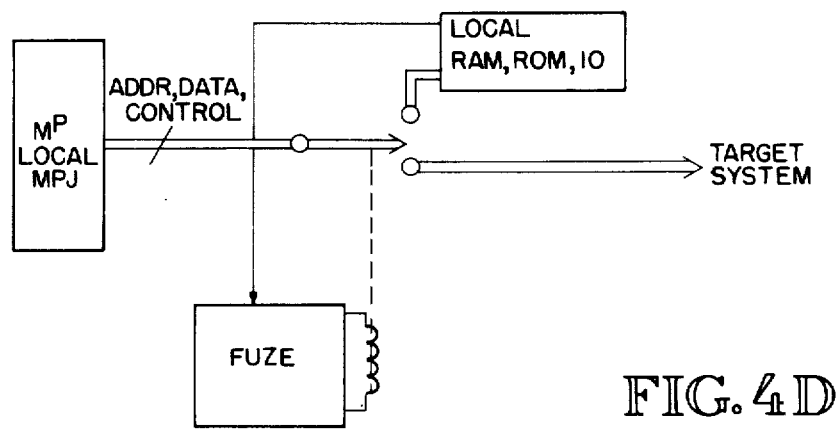
FIG. 4A is an illustrative program listing representing the FUZE circuit operation.
FIG. 4D is a highly simplified schematic representation of the operation of the FUZE circuit.
Figure 4B:
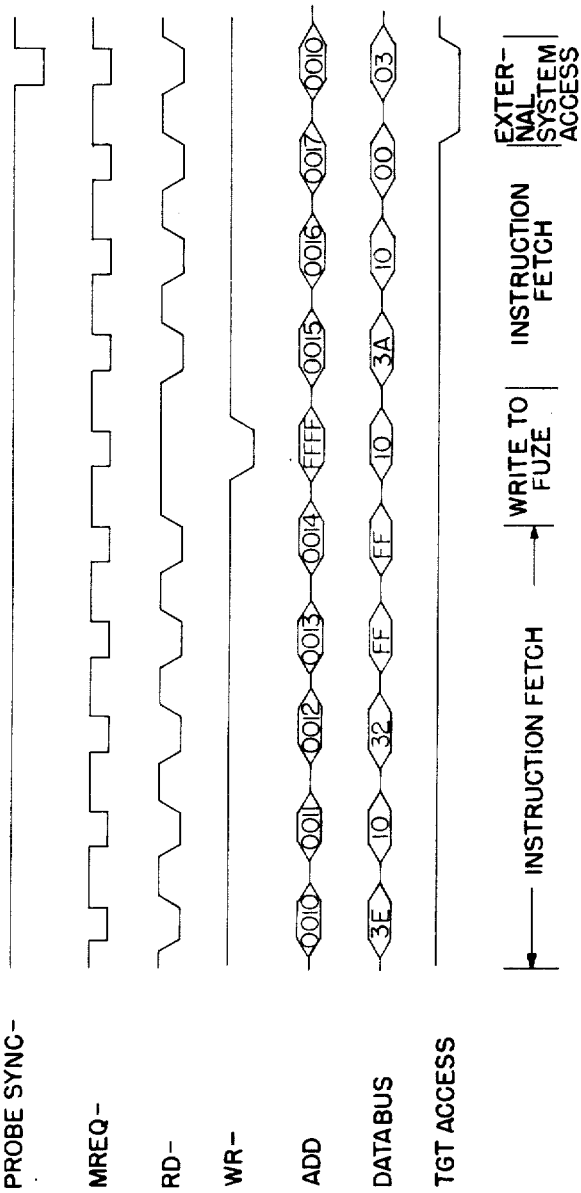
FIG. 4B is a timing diagram representing the operation of the FUZE circuit and interrelated control system signals operating under the program shown in FIG. 4A.
Figure 4C:
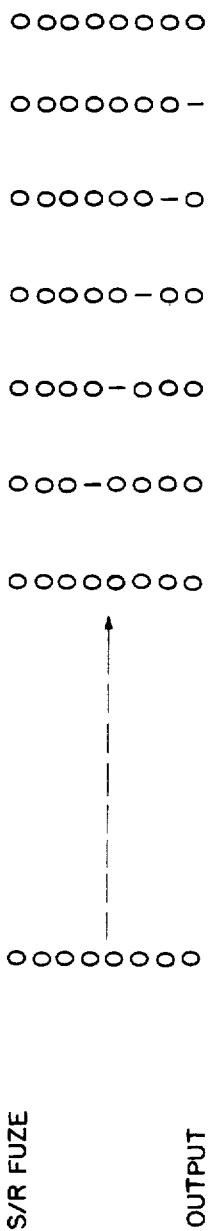
FIG. 4C is a sequence diagram representing the status of the FUZE shift register during the corresponding periods of time illustrated in the timing diagram in FIG. 4B.

A timing device such as the FUZE circuit is utilized because we need to look at a specific bus cycle in the target system, and we need time to set up the required conditions in both the local and the target system. The operation of the FUZE circuit is illustrated more fully in FIGS. 4A, 4B, 4C and 4D. FIG. 4A illustrates a representative program listing for carrying out the initial steps of setting up the local and target system with the desired conditions and then reading the target system. FIG. 4B is a timing diagram which corresponds to the implementation of the program steps set out in FIG. 4A. First, the instructions are fetched, then the FUZE is loaded with a number which determines the number of machine cycles until the target system read operation. The number inserted in the FUZE will remain the same for any given microprocessor and is dependent on the microprocessor's operational characteristics. Those characteristics, and therefore the FUZE number, may differ from microprocessor to microprocessor. Once the FUZE has been loaded, the FUZE, in essence, delays the glance at the target system until the proper conditions have been set up in the local and target system. In other words, the system is given the necessary amount of time to set up the local system in order to establish the desired state in the target system before the target system is accessed and the state of the node being probed sampled. FIG. 4C illustrates the status of the FUZE shift register during the timing sequence illustrated. FIG. 4D is a simplified diagrammatic illustration of the FUZE operation.

Connected to the output of the FUZE circuit is inverter 146, which is in turn connected to AND gate 148, having inverted inputs and outputs. Another input of the AND gate is connected to OR gate 150, which has inverted inputs and outputs. The OR gate inputs are connected to the read and write lines of the microprocessor 100. The OR gate produces a signal, RW—, which is low for every read/write bus cycle. In other words, it is low during each portion of a cycle in which data is being transferred. The AND gate provides an output, designated PROBE SYNC—, when FUZE has fired (i.e., target system access is desired) and we are transferring data as indicated by the OR gate 150.

A data bus buffer 152 is provided between the target system data lines and the control system MPU. This buffer is a conventional octal bus transceiver.

The data lines and control lines of MPU 100 are selectively connected to the control lines of the target circuit through control line buffers. The control lines from MPU 100 are connected through one set of inputs on a pair of quad, 2 input data selector multiplexers 154 and 156. The data lines are connected to the alternate inputs of the quad data selector/multiplexers 154 and 156 through an octal latch 158. The data selector multiplexers 154 and 156 and octal latch 158 form the control line buffers. The control line buffers have three states; namely, an inactive state (disabled); a state in which control lines from the MPU 100 are followed by the target MPU control lines; and a state in which the target MPU lines follow outputs of latch 158. The latch 158 outputs are controlled by MPU 100 output and the SET CTL LATCH— signal from the address decoder. The latch outputs are changed by similar commands for each desired state to be imposed on the target system control lines.

The above-described circuitry is manipulated under the control of the microprocessor unit 100.

The signal identification is implemented through the use of a nontraditional stimulus. The signals are used to identify all data, address and control lines by identifying signals impressed on the lines by the stimulus as well as the complements of these signals. This identification is done by providing tables of signatures in the program residing in the control system. The signatures represent those signatures which would be detected on data, control, and address lines and lines connected to such lines and their complements in a properly operating target system.

The search is carried out in three sequential operations. The sequence is in the order of probability of finding a particular node associated with a particular line or combination of lines. This sequence is not essential. The most likely form of line to be located in the target kernel is one associated with a data line; the next most likely is one associated with an address line, and finally, the least likely is one associated with a control line.

The term kernel refers to that portion of a circuit closely associated with the MPU and its related memory, and closely associated input and output devices. A line associated with a data line is identified through a process of performing write or similar operations to a single address in the target system so that the target system address lines are stimulated in a pre-determined manner. The choice of the fixed address for stimulation is important. It should be in a RAM area or in an area not decoded to access any device. For some microprocessors, certain areas are always designated as RAM areas and the control system can be programmed to always write to this area. For other microprocessor-based circuits, the RAM area must be entered into the control system prior to stimulation in order to ensure proper operation.

The pattern selected to be written to the address is a 256-count pattern. The number of different possible 256 one-bit events occurring at the probed node is 2 to the 256th power. All of these events map, however, onto 64K possible unique 16-bit signatures. A longer excitation will have many more possible sequences. Nevertheless, these still map onto only 64K different signatures. Consequently, there is not any significant advantage in having a particularly long stimulation sequence, since the number of possible signatures remains constant. What is important is that the stimulus be different for each stimulated line and unlikely to be generated inadvertently by other incidental signals in the system. If this is done, the probability that any two lines will have the same signature is quite small. The probability increases as the number of different lines increases. But as long as the number of lines remains a small fraction of 64K, there should be no problem.

Figure 5:
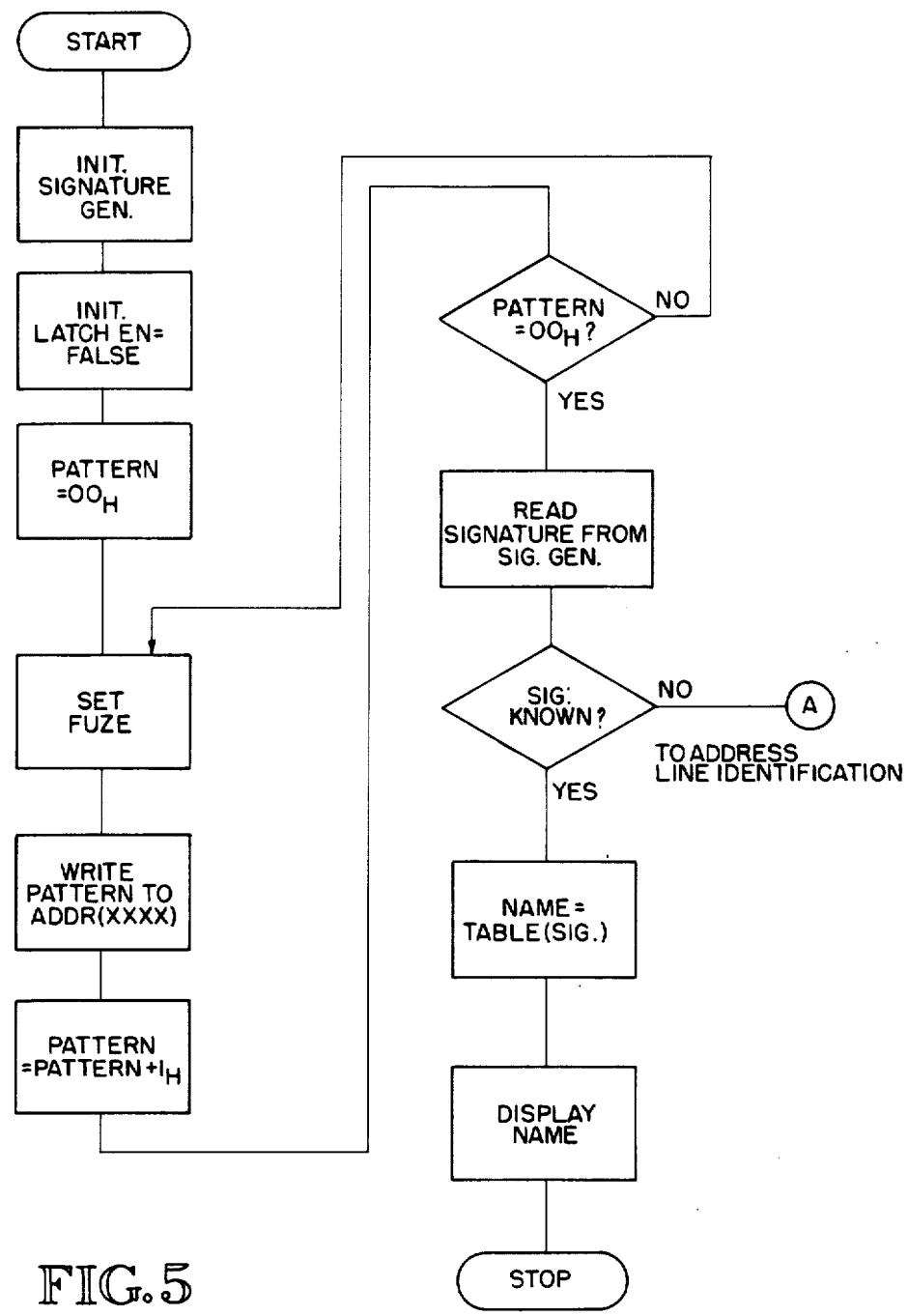
FIG. 5 is an operational flow-chart for the data line identification process.

The stimulus for taking signatures in the data line identification mode is the series 00, 01 ..., FF (hexadecimal). This sequence is implemented as shown in FIG. 5. First the signature generation hardware is initialized. The FUZE is set and then the first element of the pattern is written to the selected, safe address in the target system. The response at the node being probed is shifted into the signature generator shift register. The previous pattern element is then incremented by 1 to acquire the next pattern in the series. The FUZE is then reset and the new pattern is written to the address in the target system. The response at the probed node is entered in the signature generator. The sequence is continued for each pattern element in the entire 256-step series. The signature for the node is then compared with signatures for data lines which would be created by a properly operating target system and the signatures for the complement of data line signals. If the signature is found in the table, the identification of the data line or an indication that it is an inversion of the data line is displayed. The signatures for the stimulation described, in hexadecimal, are shown in Table 1. If the signature is not found, then the next operation is conducted.

TABLE 1

| Data Line Pattern and Signatures | |
|---|---|
| Pattern = (00,01, ..., FF) | |
| d0: Signature = 96ec, | Complement = 2dd8 |
| d1: Signature = 725b, | Complement = c96f |
| d2: Signature = e5ed, | Complement = 5ed9 |
| d3: Signature = 5be0, | Complement = e0d4 |
| d4: Signature = 7e25, | Complement = C511 |
| d5: Signature = 85ea, | Complement = 3ede |
| d6: Signature = 77c7, | Complement = ccf3 |

TABLE 1-continued

| Data Line Pattern and Signatures | |
|---|---|
| d7: Signature = 6ebe, | Complement = d58a |

Figure 6:
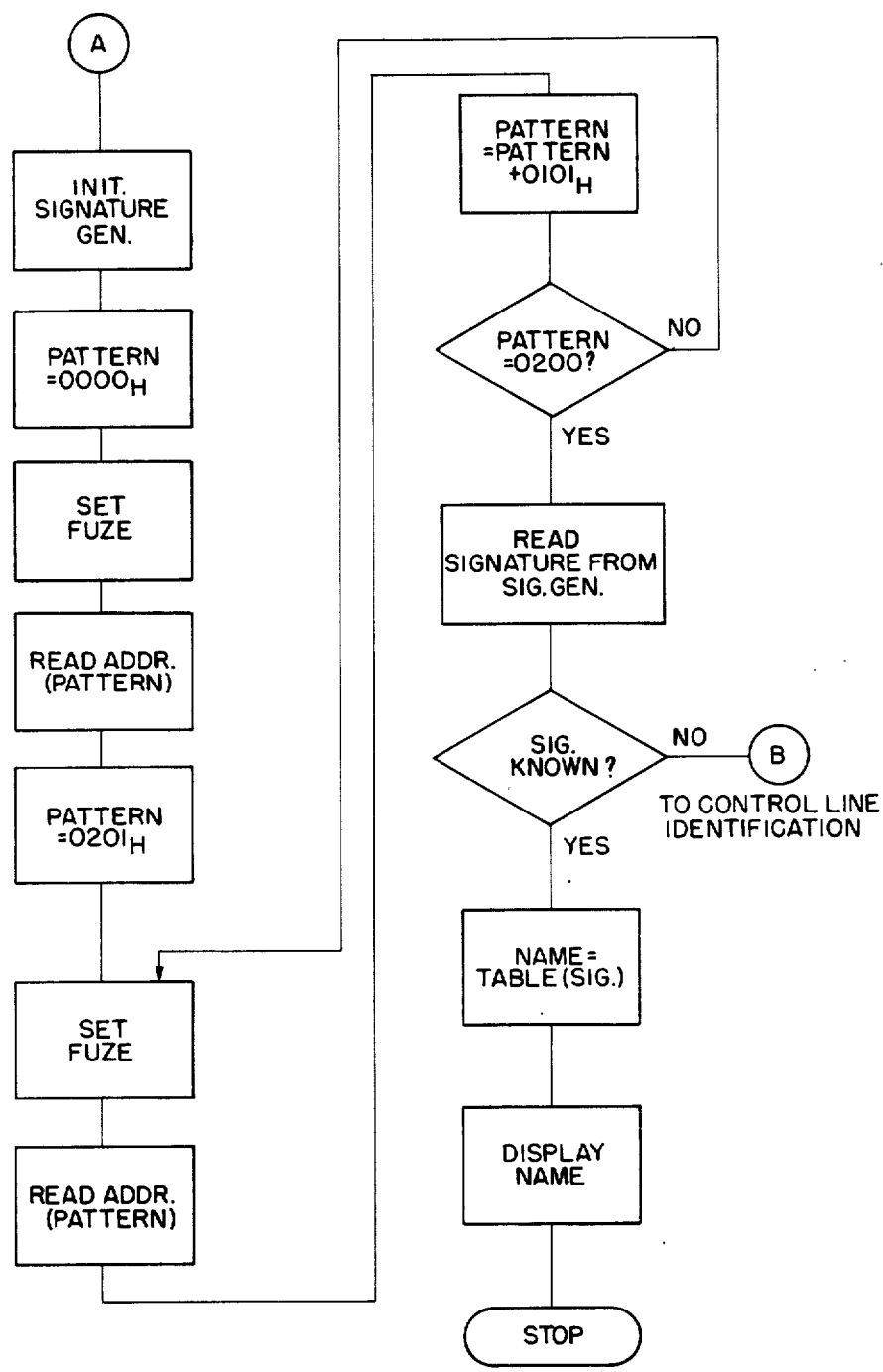
FIG. 6 is a flow-chart for the address line identification process.

The next operation conducted if the node has not been identified is to see if the node is associated with an address line. The operational sequence is shown in FIG. 6. In this operation the address lines are stimulated in a pre-determined manner. The target system address lines may be stimulated simultaneously, or they may be stimulated in groups or individually. In order to speed the identification operation, they are preferably stimulated simultaneously. In order to stimulate the address lines, the target system is read at a series of addresses determined by a special pattern. This has the effect of setting the target system address lines to the pattern. The operation need not be a read operation, what is essential is that a pattern be imposed on the target system address line. The address read is determined by the stimulation pattern. For the low address lines, the stimulation pattern sequence is 00, 01 ..., FF (hexadecimal). For the high address lines, the stimulation pattern is 00, 02, 03 ..., FF, 00 (hexadecimal). Other stimulation patterns may be selected. The stimulation for the upper and lower address lines must be different and non-complementary so that the signatures for the lower address lines and their complements must be different from the signatures for the upper address line and their complements.

To implement the stimulation, the signature generation hardware is initialized and then the pattern is established with the first element, 0000. The FUZE circuit is then set; and when the FUZE circuit is triggered, the target system address corresponding to the pattern is read from the target system. The response at the node being probed is shifted into the signature generator. The pattern is now set to the next pattern element, 0201 (hexadecimal), as shown in FIG. 6, and the FUZE circuit set. The target system is then read from the address designated by the changed pattern and the response at the probed node entered into the signature generator. The pattern is now incremented by 0101 and the FUZE setting, target address line stimulation, signature generator incrementing and pattern incrementing process continued by pattern increments of 0101 (hexadecimal) until the pattern reaches 0200. At this point, the signature generated at the probed node is then read and compared to known signatures for the address lines and their complements. The signatures expected are shown in Table 2. If the signature at the node is identified, the address line to which is corresponds or its complement is identified. If it is not identified, then the operation proceeds to the next stage.

TABLE 2

| Address Line Pattern and Signatures | |
|---|---|
| Pattern = (00,01, ..., FF) | |
| a0: Signature = 96ec, | Complement = 2dd8 |
| a1: Signature = 725b, | Complement = c96f |
| a2: Signature = e5ed, | Complement = 5ed9 |
| a3: Signature = 5be0, | Complement = e0d4 |
| a4: Signature = 7e25, | Complement = w511 |
| a5: Signature = 85ea, | Complement = 3ede |
| a6: Signature = 77c7, | Complement = ccf3 |
| a7: Signature = 6ebe, | Complement = d58a |
| Pattern = (00,02,03 ..., FF,00) | |
| a8: Signature = 4b76, | Complement = f042 |
| a9: Signature = e4b7, | Complement = 5f83 |

TABLE 2-continued

Address Line Pattern and Signatures

| | |
|---|---|
| a10: Signature = cbdb, | Complement = 70ef |
| a11: Signature = b7c1, | Complement = 0cf5 |
| a12: Signature = fc4b, | Complement = 477f |
| a13: Signature = 0bd5, | Complement = b0e1 |
| a14: Signature = ef8e, | Complement = 54ba |
| a15: Signature = dd7d, | Complement = 6649 |

Figure 7:
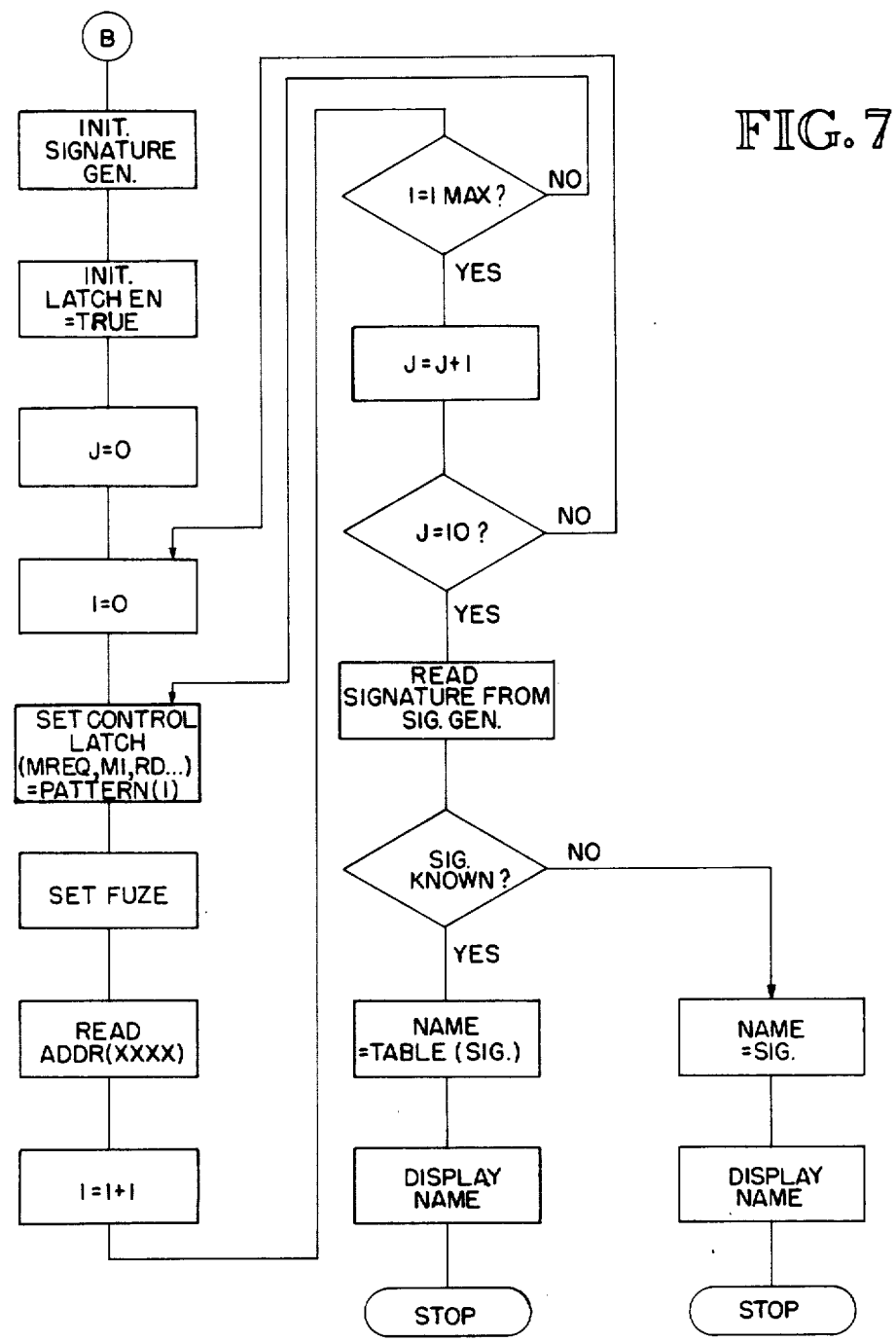
FIG. 7 is a flow-chart for the control line identification process.

In order to identify a node associated with the target system control lines, the control lines for the target system are stimulated with a special pattern sequence. The pattern is shown in Table 3. This sequence is carefully chosen to avoid potentially trouble causing conditions such as might result from setting both RD— and WR— low simultaneously. In this operation of the process, as illustrated in FIG. 7, the signal identification hardware and the control latch are initialized and the control latch is set to the first element of the pattern. The FUZE is then set, and data is read from a single selected address location in the target system. Even though the read cycle is performed by MPU 100, the type of bus cycle performed in the target system will be a function of the control line settings as determined by the pattern element in the latch and might not be a read cycle in the target system. The criteria for selection of the address to be read are the same as those criteria discussed above in connection with selection of a safe target system address in identification of nodes associated with target system data lines operation. Normally, the same address will be selected for control line identification as was used for the earlier operation for data line identification. The response at the node being probed is shifted into the signature generator. The latch setting, FUZE setting, target control line stimulation, and monitoring of the response by the signature generator is repeated for each element of the pattern. The entire process repeated several times for the entire pattern sequence. The signature of the probed node is then compared with known signatures for control lines and their complements. The expected signatures are shown in Table 3. If it is identified, then the name of the control line, its complement is displayed. In addition to the signatures for control lines and their complements, common combinations of control lines and their complements will be included in the signature table to permit their identification.

TABLE 3

Control Line Pattern and Signatures

Pattern =

| | | |
|---|---|---|
| RFSH- | Signature = 8022, | Complement = 5c2a |
| M1- | Signature = 4f1d, | Complement = 9315 |
| MREQ- | Signature = 8de8, | Complement = 51e0 |
| RD- | Signature = 96a8, | Complement = 4aa0 |
| IORQ- | Signature = 802d, | Complement = 5c25 |
| WR- | Signature = ee98, | Complement = 3290 |
| BUSACK- | Signature = d664, | Complement = 0abc |
| HALT- | Signature = af93, | Complement = 739b |
| RFSH & MREQ | Signature = c73a, | Complement = 1b32 |
| M1 & MREQ | Signature = 4700, | Complement = 9b08 |
| M1 & RD | Signature = 5553, | Complement = 895b |
| M1 & IORQ (INTACK) | Signature = 6853, | Complement = b45b |
| M1 & MREQ & RD | Signature = a49d, | Complement = 7895 |
| MREQ & RD | Signature = fe89, | Complement = 2281 |
| MREQ & WR | Signature = 2d0a, | Complement = f102 |
| IDRQ & RD | Signature = 1685, | Complement = ca8d |
| IDRQ & WR | Signature = 0b42, | Complement = d74a |
| HALT & RFSH & MREQ | Signature = 85a1, | Complement = 59a9 |

TABLE 3-continued

Control Line Pattern and Signatures

| | | |
|---|---|---|
| HALT & M1 & MREQ | Signature = 5264, | Complement = 8e6c |
| HALT & M1 & RD | Signature = 31dc, | Complement = edd4 |
| M1 & MREQ & RD | Signature = 10b4, | Complement = ccbc |
| MREQ + IORQ | Signature = 0dc5, | Complement = d1cd |
| RD + WR | Signature = 7830, | Complement = a438 |
| High (1) | Signature = dc08, | Complement = 0000 |

If, after completion of the three above operations, the node has not been identified, then the signature for the node will be displayed and, if desired, an indication that a node has not been identified will be included. This permits the possible correlation of this signature to signatures for other nodes which may not be identifiable where, for example, target system lines may be shorted together.

The foregoing operations will be performed in less than one second.

While this invention has been described in conjunction with a specific embodiment of the signal identification equipment for circuits based on a specific microprocessor and its application processes, it should be understood that these are merely illustrative. Numerous modifications and alterations may be made to the apparatus, in its use, and the method employed without departing from the spirit and scope of the invention, and it is intended that the patent shall cover whatever feature and processes of patentable novelty exists in the invention and are encompassed within the following claims.

We claim:

1. A method of identifying nodes in a target system which is microprocessor based comprising the steps of:
   a. impressing on the target system a stimulus pattern which would provide responses for the microprocessor associated nodes in the target system which are indicative of the manner of association with the microprocessor;
   b. generating a signal corresponding to the response at a node to be identified;
   c. comparing the response signal with signals for responses which would be found for nodes associated with the target system microprocessor if it were operating properly; and
   d. indicating whether the node is associated with the target system microprocessor if a response match is found.

2. A method of identifying nodes in a target system which is microprocessor based, as claimed in claim 1, wherein the indicating step further includes identifying that portion of the microprocessor with which the node is associated.

3. A method of identifying nodes in a target system which is microprocessor based as claimed in claim 1, wherein the stimulus impression step includes impressing a pattern on the data lines of the target systems which is selected to provide a unique response for each data line and its complement and wherein the indication step includes indicating if the node is associated with a data line.

4. A method of identifying nodes in a target system which is microprocessor based, as claimed in claim 3 wherein the indication step further provides indicating the data lines with which the node is associated and indicating whether or not a signal appears at the node which is a complement of the signal which would appear on the properly operating data line.

5. A method of identifying nodes in a target system which is microprocessor based, as claimed in claim 1 wherein the stimulus impression step includes impressing a pattern on the address lines of the target system which is selected to provide a unique response for each address line and its complement and wherein the indication step includes indicating if the node as associated with an address line.

6. A method of identifying nodes in a target system which is microprocessor based, as claimed in claim 5 wherein the indication step further provides indicating the address line with which the node is associated and indicating whether or not a signal appears at the node which is a complement of the signal which would appear on the properly operating address line.

7. A method of identifying nodes in a target system which is microprocessor based, as claimed in claim 1, wherein the stimulus impression step includes impressing a pattern on the control lines of the target system which is selected to provide a unique response for each control line and its complement and wherein the indication step includes indicating if the node is associated with a control line.

8. A method of identifying nodes in a target system which is microprocessor based, as claimed in claim 7 wherein the indication step further provides indicating the control line with which the node is associated and indicating whether or not a signal appears at the nodes which is a complement of the signal which would appear on the properly operating control line.

9. A method of identifying nodes in a target system which is microprocessor based, as claimed in claim 1, wherein the stimulus impression step includes impressing a pattern on the data lines of the target system which is selected to provide a unique response for each control line and selected combinations of the control lines and their complements and wherein the indication step includes indicating if the node is associated with a control line or a combination of control lines.

10. A method of identifying nodes in a target system which is microprocessor based, as claimed in claim 9 wherein the indication step further provides indicating the control line or combinations of control lines with which the node is associated and indicating whether or not a signal appears at the node which is a complement of the signal which would appear on the properly operating control line or combination of control lines.

11. A method of identifying nodes in a target system which is microprocessor based comprising the steps of:
  a. impressing on the target system a first stimulus pattern which would provide signatures at the nodes associated with the data lines of the target system microprocessors unique for each data line and its complement;
  b. impressing on the target system a second stimulus pattern which would provide a unique signatures at the nodes associated with the address lines of the target system microprocessor unique for each address line and its complement;
  c. impressing on the target system a third stimulus pattern which would provide the unique signatures at the nodes associated with the control lines of the target system microprocessor unique for each control line and its complement; and
  d. generating a signature at the node to be identified in response to the impressed patterns;
  e. comparing the signature from the node to be identified with the signatures which would be found at the nodes associated with the target system microprocessor if they were operating properly; and
  f. indicating whether the nodes are associated with a data address, or control line of the target system microprocessor.

12. An apparatus for identifying nodes in a microprocessor based target system comprising:
  a. a probe for use in selecting the node to be identified;
  b. means for connecting the identification apparatus to the target system to permit the introduction of signals into the target system;
  c. a control system connected to the probe and target system connection means, including means for impressing a stimulus pattern on the target system which is indicative of the manner of association of the node with the microprocessor, means for generating a first signal representative of the response to the stimulus pattern at the node probed, means for comparing the first signal to signals which correspond to responses which would be found on lines associated with the target system microprocessor if the target system were operating properly and means responsive to the comparison means for providing a second signal to indicate that portion of the target system microprocessor with which the node is associated.

13. An apparatus, as claimed in claim 12, further comprising means, responsive to the signal indicating that portion of the target microprocessor with which the node is associated, for displaying the identity of the connection on the microprocessor with which the node is associated.

14. An apparatus for identifying nodes in a microprocessor based target system, as claimed in claim 13, wherein the stimulation impression means includes means for impressing a stimulus pattern on the data lines of the target system and wherein the stimulus pattern provides a unique signature for each data line and its inversion.

15. An apparatus for identifying nodes in a microprocessor based target system, as claimed in claim 14, wherein the stimulation impression means includes means for impressing a stimulus pattern on the address lines of the target system and wherein the stimulus pattern provides a unique signature for each address line and its inversion.

16. An apparatus for identifying nodes in a microprocessor based target system, as claimed in claim 14, wherein the stimulation impression means includes means for impressing a stimulus pattern on the control lines of the target system and wherein the stimulus pattern provides a unique signature for each control line and its inversion.

* * * * *